US007244488B2

(12) United States Patent
Kurihara et al.

(10) Patent No.: US 7,244,488 B2
(45) Date of Patent: Jul. 17, 2007

(54) ELECTROPHOTOGRAPHIC TRANSFER PAPER

(75) Inventors: Eizo Kurihara, Ebina (JP); Ryosuke Nakanishi, Ebina (JP); Tsukasa Matsuda, Ebina (JP); Tomofumi Tokiyoshi, Koto-ku (JP); Fumihiko Shimizu, Koto-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/042,380

(22) Filed: Jan. 26, 2005

(65) Prior Publication Data

US 2005/0281990 A1 Dec. 22, 2005

(30) Foreign Application Priority Data

Jun. 17, 2004 (JP) ............................ 2004-180145

(51) Int. Cl.
*B32B 7/02* (2006.01)

(52) U.S. Cl. ................ 428/212; 428/195.1; 428/310.5; 428/315.5; 428/318.8; 428/319.3; 428/446; 428/480; 428/484.1; 430/124; 430/126

(58) Field of Classification Search ................ 430/124, 430/126; 428/195.1, 212, 310.5, 315.5, 446, 428/480, 484.1, 318.8, 319.3
See application file for complete search history.

(56) References Cited

U.S. PATENT DOCUMENTS

| | | | | |
|---|---|---|---|---|
| 4,049,448 | A * | 9/1977 | Honjo et al. | 430/127 |
| 5,208,211 | A * | 5/1993 | Kurotori et al. | 503/227 |
| 5,759,672 | A * | 6/1998 | Fujii et al. | 428/195.1 |
| 5,804,350 | A * | 9/1998 | Sekiguchi et al. | 430/108.4 |
| 6,312,788 | B1 * | 11/2001 | Mohri et al. | 428/195.1 |
| 6,558,866 | B2 * | 5/2003 | Hosoi et al. | 430/126 |
| 2003/0036014 | A1 * | 2/2003 | Hosoi et al. | 430/124 |
| 2003/0059601 | A1 * | 3/2003 | Tokiyoshi et al. | 428/328 |
| 2003/0186061 | A1 * | 10/2003 | Murata et al. | 428/421 |

FOREIGN PATENT DOCUMENTS

| | | |
|---|---|---|
| JP | 05-127413 | 5/1993 |
| JP | 05-216322 | 8/1993 |
| JP | 06-011982 | 1/1994 |
| JP | 09-171266 | 6/1997 |
| JP | 10-221877 | 8/1998 |
| JP | 11-010762 | 1/1999 |
| JP | 11-282192 | 10/1999 |
| JP | 2000-275891 | 10/2000 |
| JP | 2000-292961 | 10/2000 |

* cited by examiner

*Primary Examiner*—B. Shewareged
(74) *Attorney, Agent, or Firm*—Oliff & Berridge, PLC

(57) ABSTRACT

An electrophotographic transfer paper has a substrate and a thermoplastic foamed resin layer which is provided on at least one surface of the substrate and has pores. In the electrophotographic transfer paper, the temperature at which the viscosity of the thermoplastic foamed resin layer becomes $1\times10^{4}$ Pa·s ranges from 60° C. to 100° C. and a gradient R of a viscosity-temperature curve of the thermoplastic foamed resin layer defined by the following Equation (1) ranges from 0.02 to 0.10:

$$R=\{\mathrm{Log}(\eta_t)-\mathrm{Log}(\eta_{t+20})\}/20 \quad (1)$$

where $\eta_t$ indicates $1\times10^4$ Pa·s and $\eta_{t+20}$ indicates the viscosity (Pa·s) of the thermoplastic foamed resin layer at the temperature higher by 20° C. than the temperature showing the viscosity $\eta_t$.

21 Claims, 2 Drawing Sheets

ELECTROPHOTOGRAPHIC TRANSFER PAPER

CROSS-REFERENCE TO RELATED APPLICATION

This application claims priority under 35 USC 119 from Japanese Patent Application No. 2004-180145, the disclosure of which is incorporated by reference herein.

BACKGROUND OF THE INVENTION

1. Field of the Invention

The present invention relates to electrophotographic transfer paper which is utilized for image formation through an electrophotographic process applied to a color copying machine, a color printer, or the like.

2. Description of the Related Art

Conventionally, examples of a method of forming a color image through an electrophotographic process include a color image forming method in which a photoconductor is irradiated with a color separation light to form an electrostatic latent image in each color; the electrostatic latent image of each color is sequentially developed with color toners such as Y (yellow), M (magenta), and C (cyan) to form a color toner image in each color; each color toner image is transferred by superimposing the color toner image on a transfer body each time the color toner image is formed; and these color toner images are heated, melted, and fixed to the transfer body.

Another example of a color image forming method is a color image forming method in which each color toner image is formed by superimposing the color toner image not on the transfer body but on the photoconductor; the superimposed color toner images are collectively transferred onto the transfer; and these color toner images are heated, melted, and fixed to the transfer body. Still another example of a color image forming method is a method in which the toner image is indirectly transferred from the photoconductor to the transfer body by using an intermediate transfer body such as a belt; specifically, this is a method in which the color toner image formed on the photoconductor in each color is superimposed on the intermediate transfer body, the superimposed color toner images are collectively transferred onto the transfer body, and these color toner images are heated, melted, and fixed to the transfer body.

The color toner is formed by mutually solving various dyes in a binder resin or by dispersing various pigments in the binder resin as coloring agents. Particle size of the color toner ranges from several micrometers to tens of micrometers. Paper substrates such as plain paper, general printing paper, and coated paper are used as acceptors for the color toner. A plurality of layers of the color images superimposed on the paper substrate are heated, melted, and fixed to form the color image (see Japanese Patent Laid-Open Application (JP-A) No. 63-92965). Because depressions and projections ranging from 10 to 100 μm are formed on a surface of the color image formed in the above-described way, the depressions and projections on the surface of the color image generate unevenness in gloss of the image.

Additionally, in order to solve the above-described problem, various methods in which a transparent thermoplastic resin layer is provided as an acceptor layer on the substrate and the toner image is embedded into the transparent thermoplastic resin layer with a heated roller fixing device are well known.

Examples of the above-described method include a method in which the toner image is transferred onto the surface of an image transfer sheet having a transparent resin layer comprising a crosslinked resin which has a glass transition temperature ranging from 40 to 70° C., and is soluble in tetrahydrofuran, and the toner image is embedded into the transparent resin layer with a belt-shaped fixing device (see JP-A No. 5-127413). Another example of the above-described method is a method in which the toner image is transferred onto the surface of the image transfer sheet; which surface is coated with the thermoplastic resin; and the toner image is embedded into the transparent resin layer with a belt-shaped fixing device (see JP-A Nos. 5-216322 and 6-11982).

Examples of an image forming method for obtaining a gloss-matched image with even gloss include a method in which the average molecular weight (Mwa) of the transparent resin provided on the surface of the transfer sheet and the average molecular weight (Mwb) of a binding resin of the color toner have a relationship shown by $Mwa-Mwb \geqq 10000$ and the image is formed with the electrophotographic transfer paper in which a melting tilt angle of the color toner to the binding resin adjusted to not more than 40 degrees at a toner-fixing temperature of the transparent resin (see JP-A No. 10-221877).

Another example of an image forming method is a method in which the image is formed with an electrophotographic transfer paper with a layer of transparent resin whose number average molecular weight (Mn) ranges from 5000 to 20000 and whose glass transition temperature ranges from 30 to 85° C. (see JP-A No. 11-160905). Still another example of the image forming method is a method in which a plasticizer is mixed in the thermoplastic resin layer and a binder or a solid component for forming a layer is softened during the fixing to embed the toner into the thermoplastic resin layer (see JP-A No. 2000-275891).

In the conventional art indicated in the above-described references, the color toner image is heated and melted to embed the color toner into the transparent resin layer on the surface of the electrophotographic transfer paper by pressing the heated roller against the color toner image when fixing the color toner image onto the transfer body.

When utilizing these methods to form an image, in a low image-density area, the toner image is embedded into the thermoplastic resin layer, and the smoothness of the whole image forming surface is enhanced and the gloss improved. However, in a high image density area, the toner image cannot be completely embedded into the thermoplastic resin layer, and a level gradation occurs whereby the image portion of the image forming surface is raised higher than the non-image portion (hereinafter, also referred to as an "image step"). The image step gives a visual impression that something is wrong with the image and, further, the existence of the image step reduces the gloss such that an image is provided with a large difference in gloss over the whole image forming surface.

As methods for eliminating the image height of the toner or the gloss difference of the whole image, methods of eliminating the impaired visual impression and the difference in gloss between the image and non-image portions caused by the image step by providing a porous coating layer (thermoplastic foamed resin layer) on a support body and embedding the toner in pores on the surface of the porous coating layer, have been proposed (see JP-A Nos. 9-171266, 11-282192, and 2000-292961).

When an image is formed using such conventional art, the toner is easily embedded into the pores on the surface of the porous coating layer during the fixing, so that the image step can be reduced and the visual impression that something is wrong and the gloss difference caused by the image step can be suppressed, when compared with paper on which a thermoplastic resin layer is provided.

Further, in the above-described art, in addition to the improvement of the toner embedding properties, the gloss difference is suppressed by decreasing the gloss itself in the image portion and the non-image portion. Therefore, the gloss of the whole image forming surface tends to be slightly decreased, and sometimes a paper on which a porous coating layer is provided is not suitable for production of a document in which a glossier finish is required.

A laminated type porous sheet in which at least two porous coating layers are provided on a support body has also been proposed as an another art which provides a porous coating layer on a support layer (see JP-A No. 11-10762). However, in the art, since at least two porous coating layers are provided on the support body, the heat capacity of the whole porous coating layer is remarkably increased. Therefore, depending on the toner used or the fixing conditions, the toner and the porous coating layer are not sufficiently melted during the fixing and sometimes an image with a sufficiently glossy finish is not obtained.

Namely, on paper on which a porous coating layer is provided on the surface, sometimes the gloss finish is insufficient even if the gloss difference of the whole image forming surface can be suppressed.

In view of the above-described problems in the conventional art, the present invention has been devised in order to provide an electrophotographic transfer paper in which the toner is embedded well in the thermoplastic foamed resin layer suring fixing, the gloss difference over the whole image forming surface is eliminated, and the image has a glossy finish, and to provide an image forming method using the electrophotographic transfer paper.

SUMMARY OF THE INVENTION

A first aspect of the present invention is to provide an electrophotographic transfer paper having a substrate and a thermoplastic foamed resin layer which is provided on at least one of surfaces of the substrate and has pores, the electrophotographic transfer paper in which temperature at which viscosity of the thermoplastic foamed resin layer becomes $1\times10^4$ Pa·s ranges from 60° C. to 100° C. and a gradient R of a viscosity-temperature curve of the thermoplastic foamed resin layer defined by the following Equation (1) ranges from 0.02 to 0.10:

$$R=\{\mathrm{Log}(\eta_t)-\mathrm{Log}(\eta_{t+20})\}/20 \qquad (1)$$

where $\eta_t$ indicates $1\times10^4$ Pa·s and $\eta_{t+20}$ indicates the viscosity (Pa·s) of the thermoplastic foamed resin layer at the temperature higher than the temperature showing the viscosity $\eta_t$ by 20° C.

A second aspect of the invention is to provide an electrophotographic transfer paper having a substrate whose air permeability measured based on JIS P 8117 is lower than 1000 seconds and a thermoplastic foamed resin layer which is provided on at least one of surfaces of the substrate and has pores, the electrophotographic transfer paper in which temperature at which viscosity of the thermoplastic foamed resin layer becomes $1\times10^4$ Pa·s ranges from 60° C. to 100° C. and a gradient R of a viscosity-temperature curve of the thermoplastic foamed resin layer defined by Equation (1) ranges from 0.015 to 0.10.

A third aspect of the invention is to provide an electrophotographic transfer paper having a substrate whose air permeability measured based on JIS P 8117 is not lower than 1000 seconds and a thermoplastic foamed resin layer which is provided on at least one of surfaces of the substrate and has pores, the electrophotographic transfer paper in which temperature at which viscosity of the thermoplastic foamed resin layer becomes $1\times10^4$ Pa·s ranges from 60° C. to 100° C. and a gradient R of a viscosity-temperature curve of the thermoplastic foamed resin layer defined by Equation (1) ranges from 0.02 to 0.15.

DETAILED DESCRIPTION OF THE INVENTION

Figure 1:
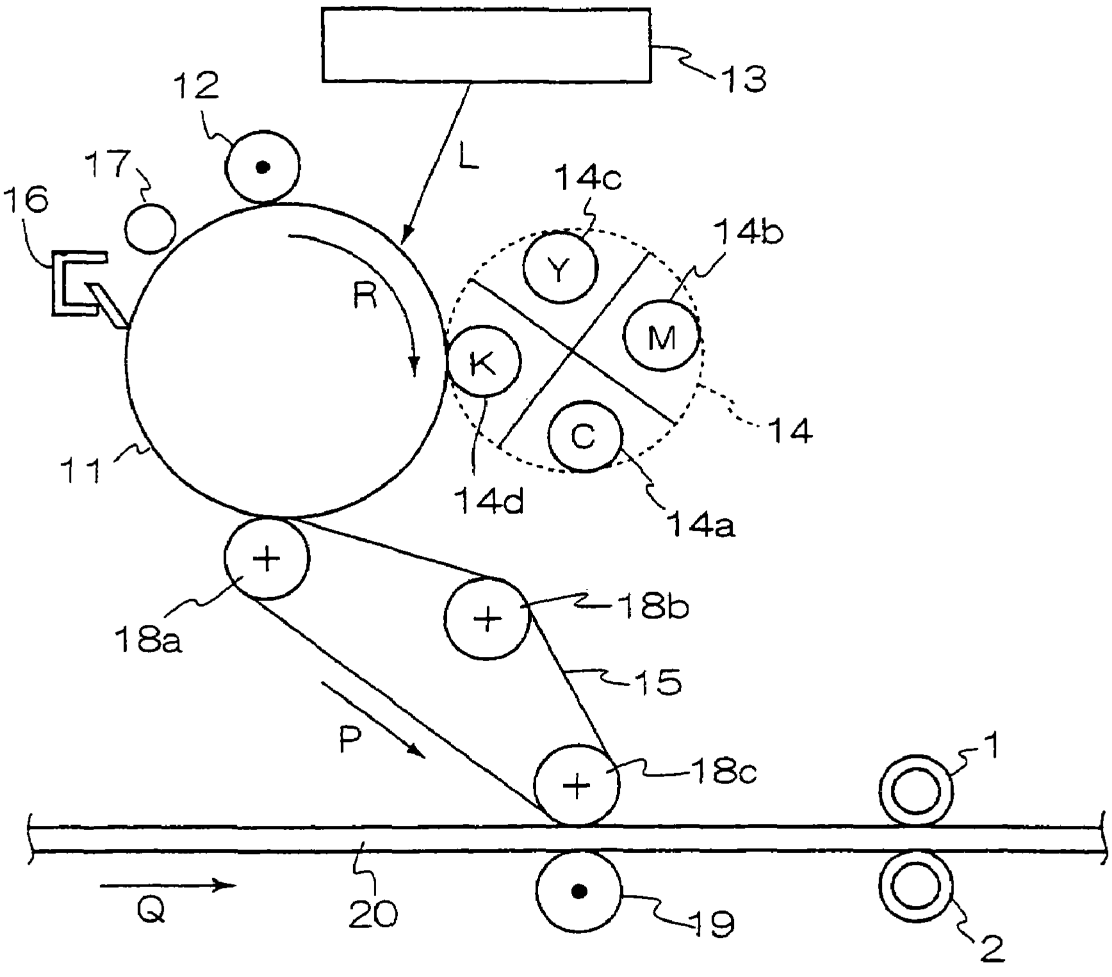
FIG. 1 shows a schematic configuration of an example of an image forming apparatus which is preferably used for an image forming method of the invention.

In order to achieve the above-described objectives, the inventors diligently researched the problems in the conventional art.

Conventionally, in an electrophotographic transfer paper which has a thermoplastic resin layer as the image receiving layer, when the toner image is fixed onto the transfer body, the fixing is performed so that the toner image is melted and embedded into the thermoplastic resin layer on the surface of the electrophotographic transfer paper by heating and pressing the toner image with a heat roller. In such a case, in the low image-density portion, the smoothness of the whole image forming surface is enhanced and the gloss improved because the toner is embedded into the thermoplastic resin layer.

However, in the high image-density portion, the toner is not completely embedded into the thermoplastic resin layer, and an image step is generated. In addition, gloss development characteristics depend on the kind of toner. Thus, when a high-density image is formed, since the gloss difference is enhanced between the non-image portion and the image portion or within the image portion, a visual impression that something is not quite right is given by the image.

As described above, a method exists in which the image step and the gloss difference caused by the image step are decreased by forming the image with paper having porous coating layer in which numerous pores are provided inside the thermoplastic resin layer or on the surface of the thermoplastic resin layer. When compared with the conventional electrophotographic transfer paper having a thermoplastic image reception layer with no pores, in the electrophotographic transfer paper produced by this method, while the image step and the gloss difference in the plane are remarkably decreased while the overall sense of glossiness is poor. This is because decreasing the difference in gloss between the non-image portion and the image portion is achieved by decreasing the gloss of the whole image forming surface. From this fact, it is thought that pore diameter in the non-image portion is not changed during the fixing.

Because the porous coating layer (thermoplastic foamed resin layer) is formed through a process of applying a thermoplastic resin coating solution, foamed by mixing with air, onto a substrate, many micro pores exist on the surface of the porous coating layer. Then, during transfer, the toner is caused to intrude into the micro pores on the surface of the porous coating layer, the porous coating layer is melted during fixing, the image portion (toner image portion) is embedded into the porous coating layer, and the pores are closed, with the effect that the image step is decreased.

In consideration of the mechanism described above, the inventors studied in detail the structure of the thermoplastic foamed resin layer throughout the fixing process in order to investigate the cause of the inferior sense of glossiness after the fixing in the electrophotographic transfer paper which has the thermoplastic foamed resin layer as the image reception layer. As a result, it was found that the thermoplastic foamed resin layer also has pores inside the layer and that a considerable number of pores remain inside the layer after the fixing. Further, it was confirmed that the pores remaining the inside of the layer act as a cushion obstructing the smoothness of the surface of the thermoplastic foamed resin layer.

Therefore, the inventors thought it can be important that the pores are decreased or eliminated inside the thermoplastic foamed resin layer during the fixing. After intensive research, it was confirmed that the number of pores and the size of the pores which remain inside the image reception layer after the fixing can largely depend on viscosity characteristics of the thermoplastic foamed resin layer with respect to temperature, and also with respect to the air permeability of the substrate on which the thermoplastic foamed resin layer is formed.

The inventors devised the invention based on the findings described above.

(Electrophotographic Transfer Paper)

The first aspect of the invention is an electrophotographic transfer paper having a substrate and a thermoplastic foamed resin layer which is provided on at least one surface of the substrate and has pores, wherein the temperature at which the viscosity of the thermoplastic foamed resin layer becomes $1\times10^4$ Pa·s ranges from 60° C. to 100° C. and a gradient R of a viscosity-temperature curve of the thermoplastic foamed resin layer defined by the following Equation (1) ranges from 0.02 to 0.10:

$$R=\{\text{Log}(\eta_t)-\text{Log}(\eta_{t+20})\}/20 \quad (1)$$

where $\eta_t$ indicates $1\times10^4$ Pa·s and $\eta_{t+20}$ indicates the viscosity (Pa·s) of the thermoplastic foamed resin layer at a temperature higher by 20° C. than the temperature showing the viscosity $\eta_t$.

The second aspect of the invention is an electrophotographic transfer paper having a substrate whose air permeability measured based on JIS P 8117 is lower than 1000 seconds and a thermoplastic foamed resin layer which is provided on at least one surface of the substrate and has pores, wherein the temperature at which the viscosity of the thermoplastic foamed resin layer becomes $1\times10^4$ Pa·s ranges from 60° C. to 100° C. and a gradient R of a viscosity-temperature curve of the thermoplastic foamed resin layer defined by Equation (1) ranges from 0.015 to 0.10.

The third aspect of the invention is an electrophotographic transfer paper having a substrate whose air permeability measured based on JIS P 8117 is not lower than 1000 seconds and a thermoplastic foamed resin layer which is provided on at least one surface of the substrate and has pores, wherein the temperature at which the viscosity of the thermoplastic foamed resin layer becomes $1\times10^4$ Pa·s ranges from 60° C. to 100° C. and a gradient R of a viscosity-temperature curve of the thermoplastic foamed resin layer defined by Equation (1) ranges from 0.02 to 0.15.

Accordingly, the first aspect, the second aspect, and the third aspect of the invention can provide an electrophotographic transfer paper in which the toner can be well embedded into the thermoplastic foamed resin layer in the fixing, the gloss difference of the whole image forming surface can be eliminated, and the image can have a glossy finish.

The viscosity of $1\times10^4$ Pa·s is necessary for sufficiently embedding the toner into the thermoplastic foamed resin layer, and it is necessary that the temperature ranges from 60 to 100° C. in the viscosity of $1\times10^4$ Pa·s. When the thermoplastic foamed resin layer shows the viscosity of $1\times10^4$ Pa·s at temperatures lower than 60° C., storage characteristics of the transfer paper can be degraded at high temperatures. On the other hand, when the thermoplastic foamed resin layer shows the viscosity of $1\times10^4$ Pa·s at temperatures more than 100° C., the softening and melting of the thermoplastic foamed resin layer can be difficult to achieve during the fixing, whereby embedding of the toner becomes insufficient.

As shown in Equation (1), the gradient R is determined based on the viscosity ($\eta_t=1\times10^4$ Pa·s) at the temperature t and the viscosity $\eta_{t+20}$ at the temperature higher by 20° C. than the temperature t. The reason why the gradient R is determined from the viscosities at two temperatures between which the temperature difference is 20° C. is that the gradient R reflects the net temperature change of the transfer paper surface during the fixing.

Namely, when the transfer paper first comes into contact with a heating member of the fixing device during the fixing, the surface of the transfer paper can be rapidly heated to a certain temperature (initial contact temperature), and the surface can be further heated until the surface is separated from the heating member, reaching the maximum surface temperature (separation temperature) immediately before the separation. In this case, the difference between the initial contact temperature and the separation temperature depends on the structure of the fixing device, and typically the difference is about 20° C. Therefore, it can be necessary that the thermoplastic foamed resin layer shows the proper viscosity within the temperature range of t to t+20° C.

In the invention, in order to cause the air inside the pores in the thermoplastic foamed resin layer to escape in order to decrease or eliminate the pores, which remain in the image reception layer after the fixing, the viscosity change of the thermoplastic foamed resin layer can be controlled during the fixing.

Further, in order to decrease or eliminate the pores, and in order to secure the smoothness of the image reception layer surface after the fixing, the direction in which the air inside the pores can be caused to escape is selected according to the air permeability of the substrate. It was also considered important that the viscosity change of the thermoplastic foamed resin layer can be controlled during the fixing.

Namely, when the substrate has a good air permeability, the air inside the thermoplastic foamed resin layer can be caused to escape in the direction of the substrate. However, when, during fixing, the viscosity of the thermoplastic foamed resin layer is rapidly decreased during the process in which the transfer paper surface is heated from the initial contact temperature to the separation temperature, the resin constituting the thermoplastic foamed resin layer penetrates the substrate, which may prevent that the smoothness of the image reception surface from being maintained after the fixing. Therefore, a relatively small viscosity change of the thermoplastic foamed resin layer is preferable in the fixing.

On the other hand, when the substrate has bad air permeability, since it can be difficult to cause the air inside the thermoplastic foamed resin layer to escape in the direction of the substrate, it can be necessary to cause the air inside the thermoplastic foamed resin layer to escape in the direction of the thermoplastic foamed resin layer surface. Further, it can be difficult for the resin constituting the thermoplastic foamed resin layer to penetrate the substrate, when compared with a substrate having good air permeability. Therefore, when the substrate has bad air permeability, the viscosity change of the thermoplastic foamed resin layer can be controlled in the fixing with emphasis on the more effective escape of the air from the inside of the thermoplastic foamed resin layer. Namely, in this case, the viscosity change can be increased to a greater extent than the substrate having good air permeability.

In the second invention, the substrate used has good air permeability (lower than 1000 sec), and the air easily penetrates the substrate. It was found that in order to obtain high gloss while also causing the air inside the thermoplastic foamed resin layer to effectively escape in the direction of the thermoplastic foamed resin layer surface in the fixing, the gradient R of the viscosity-temperature curve of the thermoplastic foamed resin layer appropriately ranges from 0.015 to 0.10.

When the gradient R of the viscosity-temperature curve of the thermoplastic foamed resin layer is lower than 0.015, the rate of decrease of the viscosity of the resin becomes slow during the fixing, and the air inside the thermoplastic foamed resin layer cannot be caused to escape in the direction of the substrate. Therefore, the pores in the thermoplastic foamed resin layer cannot all be eliminated during the fixing, and the remaining pores can act as a cushion obstructing the smoothness of the image reception surface after the fixing, so that an overall high sense of glossiness cannot be obtained.

When the gradient R of the viscosity-temperature curve of the thermoplastic foamed resin layer is more than 0.10, the viscosity of the resin becomes too low in the fixing, and the melted thermoplastic foamed resin layer can excessively penetrate the substrate. Because the penetration of the melted thermoplastic foamed resin layer into the substrate is unevenly generated, the image reception surface becomes roughened after the fixing, and an overall high sense of glossiness cannot be obtained.

It is preferable that the gradient R ranges from 0.018 to 0.09. It is more preferable that the gradient R ranges from 0.02 to 0.08. Although the lower limit of the air permeability of the substrate is not particularly restricted, it is preferable that the air permeability is not lower than 10 sec, more preferable that the air permeability is not lower than 20 sec, and particularly preferable that the air permeability is not lower than 50 sec.

In the third invention, on the other hand, the substrate used has a high value of air permeability (not lower than 1000 sec). In this case, it can be difficult to cause the air inside the thermoplastic foamed resin layer to escape in the direction of the substrate in the fixing. Therefore, it can be necessary to make it easy for the air inside the thermoplastic foamed resin layer to escape in all directions except for the direction of the substrate by completely melting the thermoplastic foamed resin layer in the fixing.

When the substrate has a high value of air permeability (not lower than 1000 sec), it was found that in order to obtain high gloss when the air inside the thermoplastic foamed resin layer is caused to escape effectively toward the direction of the thermoplastic foamed resin layer surface in the fixing, the gradient R of the viscosity-temperature curve of the thermoplastic foamed resin layer appropriately ranges from 0.02 to 0.15.

When the gradient R of the viscosity-temperature curve of the thermoplastic foamed resin layer is lower than 0.02, the thermoplastic foamed resin layer cannot be completely melted in the fixing, and pores can remain inside the thermoplastic foamed resin layer.

When the gradient R of the viscosity-temperature curve of the thermoplastic foamed resin layer is more than 0.15, the thermoplastic foamed resin layer can be over melted in the fixing, which can generate problems in that the resin constituting the thermoplastic foamed resin layer can adhere to the fixing member such as a fixing roller in the fixing or the resin can be tangled around the fixing roller.

It is preferable that the gradient R of the viscosity-temperature curve of the thermoplastic foamed resin layer ranges from 0.03 to 0.15. It is more preferable that the gradient R ranges from 0.04 to 0.12. Although the upper limit of the air permeability of the base material is not particularly restricted, it is preferable that the air permeability is not more than 20000 sec, and it is more preferable that the air permeability is not more than 15000 sec.

Methods of controlling the physical properties (for example, molecular weight distribution) of the thermoplastic foamed resin used for the formation of the thermoplastic foamed resin layer can be cited as examples of the methods of controlling the gradient R of the viscosity-temperature curve of the thermoplastic foamed resin layer to keep it within the above-described range.

When at least two kinds of thermoplastic foamed resins are used for the formation of the thermoplastic foamed resin layer, it is preferable to use thermoplastic foamed resins which are mutually soluble. In addition, the gradient R of the viscosity-temperature curve can be controlled to remain within the above-described range by the use of a blend of thermoplastic foamed resins having the different physical properties and structures.

Specifically, in the case of the use of a polyester resin in which weight average molecular weight Mw is 10000 and the molecular weight distribution (weight average molecular weight Mw/number average molecular weight, Mn) is 4.2, the gradient R becomes 0.065. A polyester resin in which the weight average molecular weight Mw is 10000, the molecular weight distribution Mw/Mn is 2.4, and the gradient R is 0.087 can be obtained by refining (removing a lower molecular weight component and a higher molecular weight component). A resin whose gradient R is 0.078 can be prepared by mixing, with a mass compounding ratio of 6:4, a polyester resin in which the weight average molecular weight Mw is 24000 and the gradient R is 0.10 and a polyester resin in which the weight average molecular weight Mw is 10000 and the gradient R is 0.06.

In the invention, it is preferable that an average diameter (average pore diameter) of the pores which exist on the surface of the thermoplastic foamed resin layer ranges from 1.5 μm to 80 μm, it is more preferable that the average pore diameter ranges from 2 μm to 60 μm, and it is particularly preferable that the average pore diameter ranges from 2 μm to 50 μm.

When the average pore diameter is in the above-described range, while the toner is embedded in the image portion, the pores are eliminated in the non-image portion. When the average pore diameter is lower than 1.5 μm, the toner cannot be completely embedded into the pore in the fixing, and sometimes the gloss can be decreased in the image portion.

When the average pore diameter is more than 80 μm, although the toner is embedded into the pore in the transfer, the pore cannot be completely closed in the fixing, and the pore can remain as a mark of the pore after the fixing.

It is preferable that a ratio of the number of pores whose diameter are not more than 80 μm to the number of the whole pores which exist on the surface of the thermoplastic foamed resin layer (the number of pores whose diameters are not lower than 80 μm/the number of whole pores) is not more than 20%. In the pore whose diameter is not lower than 80 μm, the pore cannot be completely closed after the fixing, and there is a high possibility that the depressions and projections remain as the mark of the pore on the surfaces of the non-image portion and the image portion. When the ratio of the number of pores whose diameters are not lower than 80 μm to the number of whole pores exceeds 20%, sometimes the decrease in gloss is caused. It is more preferable that the ratio of the number of pores whose diameters are not lower than 80 μm to the number of whole pores is not more than 5%, and it is particularly preferable that the ratio of the number of pores whose diameters are not lower than 80 μm to the number of whole pores is substantially zero.

It is preferable that an area rate of the pore which exists on the surface of the thermoplastic foamed resin layer (surface pore area rate) ranges from 10% to 80%, and it is more preferable that the surface pore area rate ranges from 20% to 70%.

When the surface pore area rate is lower than 10%, the toner can be insufficiently embedded into the pore in the transfer, the depressions and projections can be generated on the surface of the thermoplastic foamed resin layer by the toner, and sometimes the gloss can be decreased. When the surface pore area rate is more than 80%, it can be difficult to form the thermoplastic foamed resin layer, the strength of the thermoplastic foamed resin layer can be decreased, and sometimes the desired performance cannot be maintained.

Because a shape of the pore formed on the surface of the thermoplastic foamed resin layer is not always a circle having perfect roundness, the pore diameter is determined by utilizing a value which is converted into the diameter corresponding to the circle on the basis of the area inside the outline obtained with an image analysis apparatus. The average pore diameter, the ratio of the number of pores having diameters not lower than 80 μm to the whole number of pores, and the surface pore area rate are determined according to the pore diameter. The average pore diameter, the ratio of the number of pores having diameters not lower than 80 μm to the whole number of pores, and the surface pore area rate are also measured by the following method. Namely, after the surface of the thermoplastic foamed resin layer is photographed, an outline of the pore on the surface is accurately drawn on transparent film with a black pen, and the measurement is performed with a drum scanner (trade name: LUZEX III, manufactured by NIRECO Corporation). The surface pore area rate is computed based on by Equation (2).

Surface pore area rate (%)=[(whole area of pore portion which exists on surface of thermoplastic foamed resin layer)/(whole area of surface of thermoplastic foamed resin layer)]×100

It is preferable that the amount of coating per single side of the sibstrate of the thermoplastic foamed resin layer ranges from 2 g/m$^2$ to 40 g/m$^2$ in terms of dry mass. When the amount of coating is lower than 2 g/cm$^2$, the toner is not completely embedded into the resin layer in the fixing, and sometimes the gloss can be decreased. When the amount of coating is more than 40 g/cm$^2$, a thickness of the thermoplastic foamed resin layer becomes excessive, and sometimes the thermoplastic foamed resin layer can be easy to be damaged. It is more preferable that the amount of coating of the thermoplastic foamed resin layer ranges from 5 g/m$^2$ to 30 g/m$^2$ in terms of dry mass, and it is particularly preferable that the amount of coating ranges from 8 g/m$^2$ to 20 g/m$^2$ in terms of dry mass. The thermoplastic resin constituting the thermoplastic foamed resin layer is not particularly limited as long as the thermoplastic resin is one of the well-known thermoplastic resins. Examples of the thermoplastic resin include a resin having an ester linkage; a polyurethane resin; a polyamide resin such as a urea resin; a polysulfone resin; a polyvinyl chloride resin; a polyvinylidene chloride resin; a polyvinyl chloride-polyvinyl acetate copolymer resin; a polyvinyl chloride-polyvinyl propionate copolymer resin; a polyol resin such as polyvinyl butyral; a cellulose resin such as an ethyl cellulose resin and a cellulose acetate resin; a polycaprolacton resin; a styrene-maleic anhydride resin; a styrene-acrylic resin; a polyacrylonitrile resin; a polyether resin; an epoxy resin; a phenol resin; a polyolefin resin such as a polyethylene resin and a polypropylene resin; a copolymer resin of olefin such as ethylene and propylene and another vinyl monomer; and an acryl resin. It is also possible that at least two of these polymers are combined to form the mixture or the copolymer.

It is also possible that a pigment is contained in the thermoplastic foamed resin layer. Examples of the pigment include inorganic pigments such as zinc oxide, titanium oxide, calcium carbonate, silicate, clay, talc, mica, calcined clay, aluminum hydroxide, barium sulfate, lithopone, silica, and colloidal silica; organic pigments having a perfect-roundness-circular, fistulous, pointed-sugar-candy-ball-shaped, doughnut-shaped, or flat shape, which are referred to as plastic pigment such as polystyrene, polyethylene, polypropylene, an epoxy resin, and a styrene-acrylic copolymer; starch powders; and cellulose powders. The scope of the pigments is not limited to these examples. It is possible to use the single polymer or the mixture of at least two of these pigments according to need.

It is preferable that the thermoplastic foamed resin layer contains a release agent. Containing the release agent can prevent the transfer paper from being tangled around the fixing roller during the fixing, and containing the release agent can also easily realize the so-called oil-free fixing in which the fixing is performed without supplying oil from the fixing device side to the surface of the fixing member.

Waxes, higher fatty acids, higher alcohols, higher fatty amides, and silicone oils can be used as the release agent. Examples of the wax include vegetable waxes such as carnauba wax and rice wax; petroleum wax such as paraffin wax, microcrystalline wax, and petrolatum wax; and synthetic hydrocarbon wax such as polyethylene wax.

Examples of the higher fatty acid include stearic acid, oleic acid, palmitic acid, myristic acid, and laurylic acid. Examples of the higher alcohol include lauryl alcohol, myristyl alcohol, stearyl alcohol, cetyl alcohol, and behenyl alcohol. Examples of the higher fatty amide include amide stearate, amide palmitate, methylene bis-stearyl amide, and ethylene bis-stearyl amide.

It is preferable that the thermoplastic foamed resin layer contains the release agent ranging from 0.1 mass % to 20 mass %. When the contained release agent is lower than 0.1 mass %, the release agent does not sufficiently exert an effect, and sometimes the transfer paper can be tangled around the heated roller in the fixing. When the contained release agent is more than 20 mass %, the amount of seep of the release agent through the surface of the thermoplastic foamed resin layer can be increased, the mark of the seep-through of the release agent can remain in the non-image portion or the image portion after the fixing.

As used herein, the term of "thermoplastic foamed resin layer" shall mean the layer being formed through the processes in which the resin coating solution is mechanically stirred to include many micro-bubbles, the resin coating solution is applied on the base material, and the resin coating solution is dried, and the layer having the pores on the surface. The term of "pore" shall mean the mark of the bubble on the surface of the thermoplastic foamed resin layer, and the pore is different from a micro-flaw or a micro-depression on the surface of the thermoplastic foamed resin layer.

In the method of generating and dispersing the bubbles in the resin coating solution (bubbling method), for example, it is possible to use a stirrer having an agitating element which is rotated while performing sun-and-planet motion, a stirrer such as a homo-mixer usually used in emulsion-dispersion and a cowlless dissolver, or an apparatus in which the air and the coating solution can mechanically be stirred while the mixture of the air and the coating solution is continuously sent to a closed system and the air can be mixed in the coating solution while the air is dispersed in the micro bubble e.g. a continuous stirrer manufactured by Gaston County in the United State or Stoke in the Netherlands. The scope of the apparatus is not limited to these examples.

It is possible that a foam stabilizer and a foaming agent are added to the resin coating solution. The foam stabilizer and the foaming agent are added when the desired bubble including state is not obtained due to a lack of mechanically stirring performance, or the foam stabilizer and the foaming agent are added in order to improve stability of the bubbles in the resin coating solution.

Specifically, higher fatty acids such as stearic acid and palmitic acid, higher fatty acid salts such as sodium lauryl sulfate, ammonium stearate, and ammonium palmitate, and higher fatty acid modifications such as alkyl alkanol amide, and sorbitan fatty ester are particularly preferable for the foam stabilizer and the foaming agent, because these materials have the effect in increasing the bubbling properties of the resin coating solution and in improving the dispersion stability of the bubbles. Although there is no restriction in selecting the foam stabilizer and the foaming agent, it is recommendable to apore the use of the material having a possibility that flow properties of the resin coating solution is obstructed or coating workability is lost. In blending quantity of the foam stabilizer and the foaming agent, it is preferable that the foam stabilizer and the foaming agent ranges from 0 to 30 mass parts in terms of the solid content (thermoplastic resins and pigments which are added when needed.) for 100 parts of the solid content included in the resin coating solution, it is more preferable that the foam stabilizer and the foaming agent ranges from 1 mass part to 20 mass parts.

The application method of forming the thermoplastic foamed resin layer on the substrate can be arbitrarily selected from the well-known methods such as a Mayer-bar coating method a gravure roller method, a roller method, a reverse roller method, a blade method, a knife method, an air knife method, an extrusion method, and a casting method.

Any of the well-known pulp including LBKP (broad-leaved tree bleaching kraft pulp), NBKP (needle-leaved tree bleaching kraft pulp), LBSP (broad-leaved tree bleaching sulfite pulp), NBSP (needle-leaved tree bleaching sulfite pulp), non-wood pulps such as cotton pulp, waste paper plup, GP (ground-wood pulp), and TMP (thermo-mechanical pulp) can be used for the base material. For the papering method, ordinary paper machines such as a Foundrinier paper machine, a cylinder paper machine, and a Yankee paper machine can appropriately be used. Fillers used for these paper machines are not particularly limited. It is possible to use inorganic fillers including calcium carbonates such as heavy calcium carbonate, precipitated calcium carbonate, and choke, silicic acids such as kaolin, calcined clay, violoferrite, sericite, talc, and titanium dioxide; and organic fillers such as urea resin and styrene.

A sizing agent is not particularly limited. It is possible to use the sizing agents such as a rosin sizing agent, a synthetic sizing agent, a petroleum resin sizing agent, and a neutral sizing agent. It also is possible to use the sizing agent in combination of the proper sizing agent such as aluminum sulfate and cationic starch and a fiber fixing agents. In addition, it is also possible to add a paper strength additive, the dye, and a pH adjuster.

In the substrate, in order to adjust electrical resistance, inorganic materials such as sodium chloride, potassium chloride, calcium chloride, sodium sulfate, zinc oxide, titanium dioxide, tin oxide, aluminum oxide and magnesium oxide, and organic materials such as alkyl phosphate ester salt, alkyl sulfate ester salt, sodium sulfonate salt, and quaternary ammonium salt can be used alone or in combination with each other.

It is possible to obtain the good image with the electrophotographic transfer paper of the invention having the thermoplastic foamed resin layer which is formed by applying the resin coating solution including the bubbles onto the substrate surface to dry the resin coating solution. Further, the surface smoothness of the electrophotographic transfer paper can be improved by using a super calender formed by appropriately combining the metal roller and the resin roller or the metal roller and the cotton roller. After applying the resin coating solution, it is also possible to further improve the surface smoothness of the thermoplastic foamed resin layer by causing the sheet which is in a semi-dry state or a dry state to come into contact with a mirror-finish cast drum which is in a humid state or a non-humid state.

When the coated paper is used as the substrate, base paper is not particularly limited. For example, it is possible to use the base paper such as acid paper whose papermaking pH is about 4.5 and acid-free paper which mainly contains alkaline filler such as calcium carbonate. In the acid-free paper, the papermaking pH ranges from acescence of about pH 6 to alkalescence of about pH 9. The coated paper used as the substrate is one which has the coating layer obtained by applying the coating solution containing the bonding agent and the pigment on at least one surface of the coated paper.

Water-soluble and/or water-dispersed high-molecular weight compound is used as the pigment coating layer bonding agent. Examples of the water-soluble and/or water-dispersed high-molecular weight compound include starches such as a cationic starch, an amphoteric starch, an oxide starch, an enzyme modified starch, a thermo-chemically modified starch, an esterified starch, and an etherified starch, cellulose derivatives such as carboxymethyl cellulose and hydroxyethylcellulose, natural or semi-synthetic high-molecular weight compounds such as gelatin, casein, soybean protein, and natural rubber, polydienes such as polyvinyl alcohol, isoprene, neoprene, and polybutadiene, polyalkenes such as polybutene, polyisobutylene, polypropylene, and polyethylene, vinyl polymers or copolymers such as vinyl halide, vinyl acetate, styrene, (metha) acrylic acid, (metha) acrylic ester, (metha) acrylic amide, and methyl vinyl ether, synthetic rubber latex such as styrene-butadienes and methyl methacrylate-butadienes, and synthetic high-molecular weight compounds such as a polyurethane resin, a polyester resin, a polyamide resin, an olefin-maleic anhydride resin, and a melamine resin. One or at least two kinds of above-described materials are properly selected and used according to a quality target of the electrophotographic transfer paper.

In formulation of the pigment bonding agent, it is preferable that the bonding agent ranges from 5 to 50 mass parts with respect to the pigment of 100 mass parts. When the combination ratio of the bonding agent is lower than 5 mass parts, the resin coating solution intrudes into the surface of the base material in applying the thermoplastic foamed resin layer onto the obtained pigment coating layer, so that the good white paper gloss cannot be obtained. When the bonding agent is more than 50 mass parts, the bubbles are generated during the application of the pigment coating layer to roughen the coating surface, so that the good white paper gloss cannot be obtained.

Examples of the pigment include mineral pigments such as heavy calcium carbonate, precipitated calcium carbonate, kaolin, calcined kaolin, structural kaolin, delaminated kaolin, talc, calcium sulfate, barium sulfate, titanium dioxide, zinc oxide, alumina, magnesium carbonate, magnesium oxide, silica, magnesium aluminosilicate, fine-particle calcium silicate, fine-particle magnesium carbonate, fine-particle precipitated calcium carbonate, white carbon, bentonite, zeolite, sericite, and smectite; and organic pigments such as a polystyrene resin, a styrene-acrylic copolymer resin, a urea resin, a melamine resin, an acrylic resin, a vinylidene chloride resin, and a benzoguanamine resin, and micro hollow particles of these organic pigments or through-hole types of these organic pigments. One or at least two kinds of these materials are utilized.

In addition to the above-described pigment materials, in the pigment coating layer solution, it is also possible to appropriately use various assistants according to need, i.e. examples of the assistant include a detergent, a pH adjustor, a viscosity modifier, a softening agent, a glossy producer, a dispersing agent, a flow modifier, a conductive inhibitor, a stabilizing agent, an antistatic agent, a crosslinking agent, an antioxidant, a sizing agent, an optical brightening agent, a coloring agent, a ultraviolet absorbing agent, an anti-foaming agent, a water resistant additive, a plasticizer, a lubricant, a preservative, and a perfume.

The amount of coating of the pigment coating layer is appropriately selected according to the intended purpose of the electrophotographic transfer paper of the invention. Usually, the amount of coating of a degree that the depressions and projections of the base material surface are completely covered with the pigment coating layer is required, and it is preferable that the amount of coating of the pigment coating layer ranges from 2 to 8 g/$m^2$ in terms of dry mass. The well-known application apparatuses are appropriately used for the application method of forming the coating layer. Examples of the application apparatus include a blade coater, an air-knife coater, a roller coater, a reverse roller coater, a bar coater, a curtain coater, a die coater, a gravure coater, a Champlex coater, a brush coater, two-roller type or metering blade type size press coater, a bill blade coater, short dwell coater and a gate roller coater.

It is also possible that the pigment coating layer is formed on one of surfaces of the base material or on both of the surfaces. It is possible that the pigment coating layer is produced in one layer, or it is possible that the pigment coating layer is produced by providing an intermediate layer having at least two layers to form the multi-layer structure. In the case of the double-sided coating or the multi-layer structure, it is not necessary that the coating solution in each layer is the same kind or the same amount of coating, and it is possible that each coating solution is formulated by properly performing the adjustment according to the required quality level. In the case where the coating layer is provided on one of surfaces of the base material, it is also possible to impart curl generation preventing properties, printability, paper feed suitability/paper discharge suitability, and the like by providing a coating layer or a antistatic layer including the synthetic resin layer, the bonding agent, and the pigment on the backside of the substrate. It is also possible to add various kinds of usage suitability by performing post-processes such as adhesion, magnetism, flame resistance, heat resistance, water resistance, oil resistance, lubrication resistance, and the like on the backside of the substrate.

In normal processes such as drying process and the surface treatment process, the substrate having the pigment coating layer is finished by adjusting moisture content so that the moisture content ranges from 3 to 10 mass % and preferably ranges 4 to 8 mass %.

When the smoothing process is performed to the substrate, a usual smoothing process apparatus such as the super calender, a gloss calender, and a soft calender is used. It is possible that on machine calendering or off machine calendering is properly performed. The mode of the pressure machine, the number of pressure nips, the heating, and the like are properly adjusted according to the usual smoothing process apparatus. However, when the smoothing process apparatus is used for the base of the transfer paper of the invention, in order that the air permeability having the lower value is compatible with the high smoothness, it is preferable that pressure weight is decreased and the value of the air permeability is decreased by enlarging the grain size of the pigment of the pigment coating layer.

However, when the smoothing process is performed the under the excessive pressure, a resin wall surrounding the bubble in the thermoplastic foamed resin layer is broken, the coating layer is compacted to decrease heat insulating properties or cushion characteristics, or sometimes the pore on the surface of the thermoplastic foamed resin layer is broken to lose the excellent transfer characteristics owned by the thermoplastic foamed resin layer. Therefore, in the smoothing process, it is necessary that process conditions are sufficiently considered.

In the electrophotographic transfer paper of the invention, it is preferable to adjust composition so that surface electrical resistance of the electrophotographic transfer paper becomes not lower than $8.0\times10^8\Omega$ at a temperature of 28° C. and a relative humidity of 85%.

(Image Forming Method)

An image forming method of the invention will be described in detail below.

The image forming method of the invention is one which utilizes the well-known electrophotographic process, and the image forming method of the invention is characterized by using the electrophotographic transfer paper of the invention as the transfer body. Although the process itself of the image forming method is not particularly limited, specifically it is preferable that the image forming method of the invention is one, which is described below.

It is preferable that the image forming method of the invention includes a latent image forming process of forming the latent image on a latent image bearing body, a development process of developing the latent image with an electrophotographic developer to form the toner image, a transfer process of transferring the toner image to the transfer body, and a fixing process of heating and fixing the toner image transferred to the transfer body onto the transfer body. It is desirable that oil-free fixing performs the fixing process.

The oil-free fixing is the fixing method in which the fixing is performed while a release agent such that the oil is not included on the surface of the fixing member, and the oil-free fixing is the fixing method which is usually performed with a fixing device in which means for supplying the mold release agent to the surface of the fixing member is omitted with the conventional fixing device. In addition to the above-described four processes, it is possible that the image forming method of the invention includes another process if necessary.

According to the oil-free fixing, the oil is not used, so that writing is easily performed onto the surface of the image while surface roughness of the obtained image is suppressed.

It is possible that the electrophotographic developer is formed by either a two-component system including the toner and a carrier or a single-component system only including the toner. It is possible to utilize the well-known toner and carrier.

A binding resin, a coloring agent, the release agent, and other additives which constitute the toner can be used by appropriately combining the well-know materials. For example, a polyester resin or a styrene acrylic resin can mainly used as the binding resin. A toner producing method is not particularly limited, and it is possible to use any well-known toner producing method such as a grinding method and polymerization method.

Referring to the accompanying drawing, an image forming method of the invention will specifically be described below. FIG. 1 shows a schematic configuration of an example of an image forming apparatus which is preferably used for the image forming method of the invention.

In FIG. 1, the numeral 1 represents a thermal fixing roller, the numeral 2 represents a pressure roller, the numeral 11 represents a photoconductor (latent image bearing body), the numeral 12 represents a roller type charging device, the numeral 13 represents an exposure device, the numeral 14*a* represents a development device on which a developer (cyan) is mounted, the numeral 14*b* represents a development device on which a developer (magenta) is mounted, the numeral 14*c* represents development device on which a developer (yellow) is mounted, the numeral 14*d* represents development device on which a developer (black) is mounted, the numeral 14 represents a development device, the numeral 15 represents an intermediate transfer body, the numeral 16 represents a cleaner, the numeral 17 represents a photo static eliminator, the numerals 18*a*, 18*b*, and 18*c* represent a bearing shaft roller, the numeral 19 represents a transfer roller, and the numeral 20 represents transfer body (electrophotographic transfer paper of the invention).

In the image forming apparatus shown in FIG. 1, the roller type charging device 12, the exposure device 13, the development device 14 which includes the development devices 14*a*, 14*b*, 14*c*, and 14*d* on which the cyan, magenta, yellow and black developers are mounted respectively, the belt-shaped intermediate transfer body 15, the cleaner 16, and the photo static eliminator 17 are sequentially arranged in clockwise direction around the photoconductor 11 which can be rotated in an arrow R direction.

The belt-shaped intermediate transfer body 15 is tensioned by the bearing shaft rollers 18*a*, 18*b*, and 18*c* which are arranged on the inside surface of the intermediate transfer body 15, and the belt-shaped intermediate transfer body 15 can be rotated in an arrow P direction. The bearing shaft roller 18*a* is pressed against the photoconductor 11 through the intermediate transfer body 15. The bearing shaft roller 18*c* is pressed against the transfer roller 19 through the intermediate transfer body 15.

The transfer body 20 can be inserted into and pass through in an arrow Q direction at an abutting portion between the outer surface of the intermediate transfer body 15 and the transfer roller 19. A thermal roller fixing device is arranged on the side of the arrow Q direction of the abutting portion of the outer surface of the intermediate transfer body 15 and the transfer roller 19. The thermal roller fixing device includes the thermal fixing roller 1 and the pressure roller 2 which is pressed against the thermal fixing roller 1. The transfer body 20 passes through the abutting portion of the outer surface of the intermediate transfer body 15 and the transfer roller 19, and then the transfer body 20 can be inserted into and pass through in the arrow Q direction at the abutting portion of the thermal fixing roller 1 and the pressure roller 2.

The image formation is performed as described below using the image forming apparatus shown in FIG. 1. The roller type charging device 12 charges the surface of the photoconductor 11 which is rotated in the arrow R direction. The latent image is formed in the charged portion on the surface of the photoconductor 12 by exposing the surface of the photoconductor 11 with an irradiation light beam L. The irradiation light beam L is emitted from the exposure device 13 based on the image information corresponding to each color of cyan, magenta, yellow, and black. The latent image formed on the surface of the photoconductor body 11 is developed to form the toner image in each color in each of the development devices 14*a*, 14*b*, 14*c*, and 14*d* which are incorporated into the development device 14. The developed toner image is transferred onto the outer surface of the intermediate transfer body 15.

As the intermediate transfer body 15 proceeds in the arrow P direction, the toner image transferred on the outer surface of the intermediate transfer body 15 is moved to the abutting portion where the transfer roller 19 is pressed against the bearing shaft roller 18*c* through the intermediate transfer body 15. When the toner image on the outer surface of the intermediate transfer body 15 passes through the abutting portion of the bearing shaft roller 18*c* and the transfer roller 19 which is pressed against the bearing shaft roller 18*c* through the intermediate transfer body 15, the toner image is transferred onto the transfer body 20 which is inserted into the abutting portion toward the arrow Q direction. When the transfer body 20 passes through the abutting portion between the thermal fixing roller 1 and the pressure roller 2 in the arrow Q direction, the toner image transferred on the transfer body 20 is fixed to the transfer body 20 to form the image.

After the photoconductor 11 transfers the toner image onto the outer surface of the intermediate transfer body 15, the photoconductor 11 is further rotated in the arrow R direction, which allows the photoconductor 11 to prepare the next image formation by removing the remaining toner on the photoconductor 11 with the cleaner 16 and eliminating the residual charge on the photoconductor 11 with the photo static eliminator 17.

A contact type thermal fixing device can be used as the fixing device used in the image forming method of the invention. For example, the thermal roller fixing device which includes the thermal fixing roller and the pressure roller can be used as the fixing device used in the image forming method of the invention. The thermal fixing roller has an elastic rubber layer on a cored bar, and is provided with fixing member surface layer if necessary. The pressure roller has the elastic rubber layer on the cored bar, and is provided with fixing member surface layer if necessary. In addition to the fixing device having the combination of such the rollers, the fixing device having the combination of the roller and the belt or the combination of the belts in which one of two members has a function of heating and/or pressing the transfer body can be used as the fixing device used in the image forming method of the invention.

A material which has excellent heat-resisting properties, high strength against deformation, and good thermal conductivity is selected as a base material (core) of the fixing member. In the case of the roller type fixing device, aluminum, iron, copper, and the like are selected. In the case of the belt type fixing device, polyimide film, stainless steel, and the like are selected. The elastic rubber layer usually made of silicone rubber, fluororubber, and the like is provided on the surface of the roller type base material.

It is possible that the fixing member contains various additives according to the purpose. For example, in order to improve abrasive resistance, or in order to control a resistance value, the fixing member contains carbon black, metal oxide, and ceramic particles such as SiC.

Figure 2:
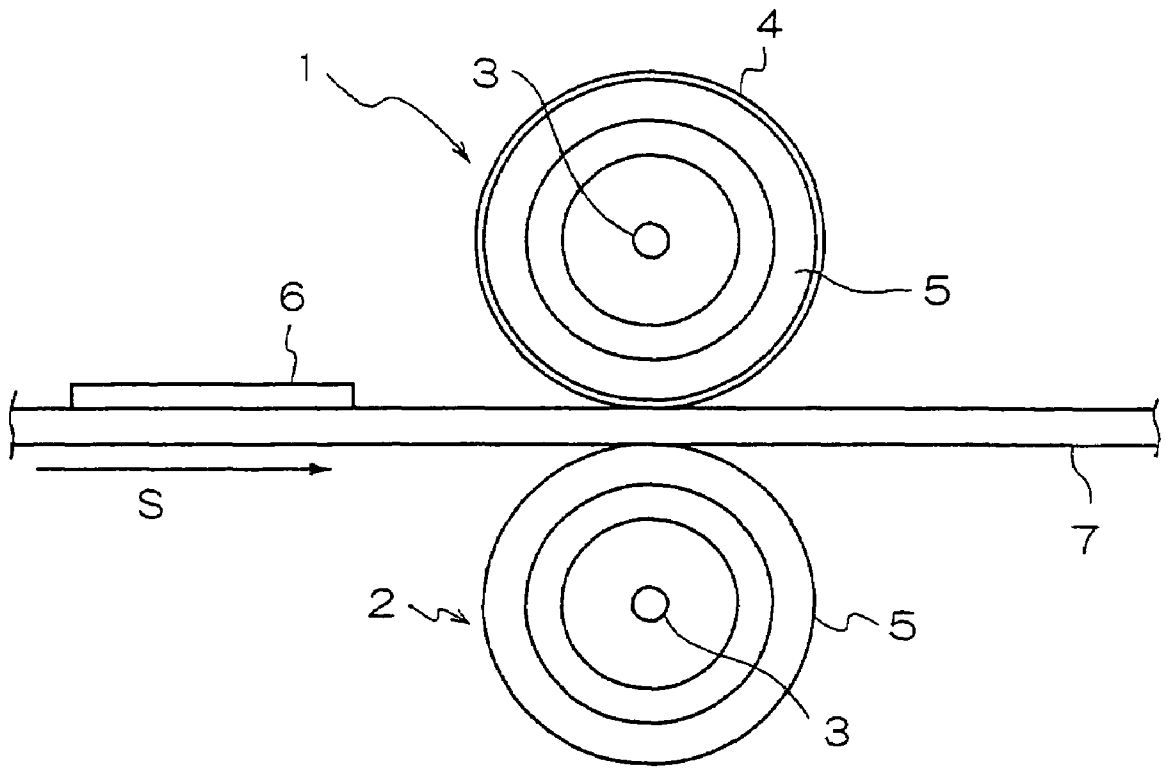
FIG. 2 shows a schematic configuration of an example of a fixing device which is used for a fixing process in an image forming method of the invention.

Referring to the accompanying drawing, a fixing process will be described in detail below. FIG. 2 shows a schematic configuration of an example of the fixing device which is used for the fixing process in the image forming method of the invention. In FIG. 2, the numeral 1 represents the thermal fixing roller, the numeral 2 represents the pressure roller, the numeral 3 represents a heat source, the numeral 4 represents a fixing member surface layer, the numeral 5 represents an elastic layer, the numeral 6 represents a toner image, and the numeral 7 represents a transfer body. The numerals 1 and 2 shown in FIG. 2 basically have the same functions as the numerals 1 and 2 shown in FIG. 1.

The fixing device shown if FIG. 2 is one in which the fixing member has a roller shape. The fixing device basically includes the thermal fixing roller 1 and the pressure roller 2 arranged on the opposite side to the thermal fixing roller 1. The heat source 3 which heats the thermal fixing roller 1 is incorporated inside the thermal fixing roller 1, and at least one layer such as the elastic layer 5 is provided so as to sheathe the heat source 3. The fixing member surface layer 4 which is located at the outermost surface is provided on the outer surface of the elastic layer 5.

The heat source 3 which heats the pressure roller 2 is incorporated inside the pressure roller 2, and at least one layer such as the elastic layer 5 is provided. The layer sheathes the heat source 3, and the layer is located at the outermost surface. It is also possible that the heat source 3 is not provided inside the pressure roller 2. A temperature controller (not shown) controls the heat source 3 so as to obtain the desired heating temperature.

The transfer body 7 on which the toner image 6 is formed on the surface side in contact with the thermal fixing roller 1 can be inserted into and pass through in an arrow S direction at the abutting portion between the thermal fixing roller 1 and the pressure roller 2. When the transfer body 7 passes through the abutting portion, the toner image 6 is fixed by the heating and the pressing to form the image on the surface of the transfer body 7.

On an as-needed basis, it is possible that a cleaning member for removing the toner adhering to the surface of the thermal fixing roller 1, a pawl (finger) for peeling off the transfer body 7 from the surface of the thermal fixing roller 1, and the like are arranged around the thermal fixing roller 1.

It is preferable that the thermal fixing roller 1 and/or the pressure roller 2 includes the elastic layer 5 having a single layer or multi layers. It is preferable that a thickness of the elastic roller 5 ranges from 0.1 to 3 mm, and it is more preferable that the thickness of the elastic layer ranges from 0.5 to 2 mm. Heat-resisting rubbers such as silicone rubbers and fluororubbers are used as the elastic layer 5. It is preferable that hardness of the rubber is not more than 60. When the fixing member has the elastic layer 5, it is advantageous that the fixing member is deformed by following depressions and projections of the toner image 6 on the transfer body 7 to improve the smoothness of the image surface after the fixing. When the thickness of the elastic layer 5 is more than 3 mm, heat capacity of the fixing member becomes larger, it takes a long time to heat the fixing member to the desired temperature, and sometimes energy consumption is also increased. When the thickness of the elastic layer is lower than 0.1 mm, the deformation of the fixing member cannot follow the depressions and projections of the toner image, unevenness of the melting is generated, and sometimes the elastic layer distortion effective in the peeling is not obtained.

EXAMPLES

The present invention will specifically be described by Examples. Needless to say, the scope of the invention is not limited to Examples. Unless otherwise specified, "part" and "%" express "mass part" and "mass %".

Example 1

The thermoplastic foamed resin layer is formed by coating bubble-contained resin coating solution having the following composition with an applicator bar immediately after foaming on one of surfaces of the substrate of commercially available high quality paper (trade name: OK Prince High Quality, manufactured by Oji paper Co., Ltd., basis weight 157 g/m$^2$, air permeability 24 sec), and the electrophotographic transfer paper whose basis weight is 167 g/m$^2$ is obtained. Table 1 shows characteristics of the substrate and the thermoplastic foamed resin layer.

(Preparation of Resin Coating Solution)

| | |
|---|---|
| Thermoplastic resin A: Mixed resin in which a polyester resin (trade name: Polyester WR-961, manufactured by The Nippon Synthetic Chemical Co., Ltd.) and a polyester resin (trade name: Fine Tex ES-675, manufactured by DAINIPPON INK AND CHEMICALS, INCORPORATED) are mixed with a mass ratio of 1:2 | 100 mass parts |
| Foam stabilizer (higher fatty acids, trade name: DC100A, manufactured by SAN NOPCO LIMITED) | 10 mass parts |
| Thickener (carboxymethyl cellulose, trade name: AG gum SG, manufactured by DAI-ICHI KOGYO SEIYAKU CO., LTD.) | 5 mass parts |
| Release agent (polyether modified silicone oil, trade name: KF-354L, manufactured by Shin-Etsu Chemical Co., Ltd.) | 5 mass parts |

A foaming process is performed so that an expansion ratio becomes three times by mixing and stirring the resin coating solution, in which the above-described components are mixed, with air at stirring rate of 1000 rpm by a continuous foaming machine (trade name: Turbo Whip TW-70, manufactured by Aicohsha Manufacturing Co., Ltd.).

When viscosity of a sample in which the prepared resin coating solution is applied and dried is measured by a flow tester while temperature is changed, the temperature at which the viscosity becomes $1\times10^4$ Pa·s is 93° C., and a gradient R of a viscosity-temperature curve is 0.038.

Example 2

The electrophotographic transfer paper whose basis weight is 167 g/m$^2$ is obtained in the same way as Example 1 except where commercially available matte paper (trade name: Loston Color White, manufactured by Oji paper Co., Ltd., basis weight 157 g/m$^2$, air permeability 900 sec) is used as the substrate. Table 1 shows characteristics of the substrate and the thermoplastic foamed resin layer.

Example 3

The electrophotographic transfer paper whose basis weight is 167 g/m$^2$ is obtained in the same way as Example 1 except where commercially available coated paper (trade name: JD Coat Paper, manufactured by Oji paper Co., Ltd., basis weight 157 g/m$^2$, air permeability 1500 sec) is used as the substrate. Table 1 shows characteristics of the substrate and the thermoplastic foamed resin layer.

Example 4

The electrophotographic transfer paper whose basis weight is 167 g/m$^2$ is obtained in the same way as Example 1 except where commercially available cast coated paper (trade name: Mirror Coat Platinum, manufactured by Oji paper Co., Ltd., basis weight 157 g/m$^2$, air permeability 16000 sec) is used as the substrate. Table 1 shows characteristics of the substrate and the thermoplastic foamed resin layer.

Example 5

The electrophotographic transfer paper whose basis weight is 167 g/m$^2$ is obtained in the same way as Example 1 except where the bubble-contained resin coating solution having the following composition is used and the stirring rate and the expansion ratio are changed. Table 1 shows characteristics of the substrate and the thermoplastic foamed resin layer.

(Preparation of Resin Coating Solution)

| | |
|---|---|
| Thermoplastic resin B: a styrene acrylic resin (trade name: ZAIKTHENE AC, manufactured by SUMITOMO SEIKA CHEMICALS CO., LTD.) | 100 mass parts |
| Foam stabilizer (higher fatty acids, trade name: DC100A, manufactured by SAN NOPCO LIMITED) | 10 mass parts |
| Thickener (carboxymethyl cellulose, trade name: AG gum SG, manufactured by DAI-ICHI KOGYO SEIYAKU CO., LTD.) | 5 mass parts |
| Release agent (polyether modified silicone oil, trade name: KF-354L, manufactured by Shin-Etsu Chemical Co., Ltd.) | 5 mass parts |

The foaming process is performed so that the expansion ratio becomes three times by mixing and stirring the resin coating solution, in which the above-described components are mixed, with air at stirring rate of 3000 rpm by the continuous foaming machine (trade name: Turbo Whip TW-70, manufactured by Aicohsha Manufacturing Co., Ltd.).

When the viscosity of a sample in which the prepared resin coating solution is applied and dried is measured by the flow tester while the temperature is changed, the temperature at which the viscosity becomes $1\times10^4$ Pa·s is 62° C., and the gradient R of the viscosity-temperature curve is 0.092.

Example 6

The electrophotographic transfer paper whose basis weight is 167 g/m$^2$ is obtained in the same way as Example 1 except where the bubble-contained resin coating solution having the following composition is used and the stirring rate and the expansion ratio are changed. Table 1 shows characteristics of the substrate and the thermoplastic foamed resin layer.

(Preparation of Resin Coating Solution)

| | |
|---|---|
| Thermoplastic resin C: Mixed resin in which a styrene acrylic resin (trade name: ZAIKTHENE AC, manufactured by SUMITOMO SEIKA CHEMICALS CO., LTD.) and a polyester resin (trade name: Fine Tex ES-675, manufactured by DAINIPPON INK AND CHEMICALS, INCORPORATED) are mixed with the mass ratio of 4:1 | 100 mass parts |
| Foam stabilizer (higher fatty acids, trade name: DC100A, manufactured by SAN NOPCO LIMITED) | 10 mass parts |
| Thickener (carboxymethyl cellulose, trade name: AG gum SG, manufactured by DAI-ICHI KOGYO SEIYAKU CO., LTD.) | 5 mass parts |
| Release agent (polyether modified silicone oil, trade name: KF-354L, manufactured by Shin-Etsu Chemical Co., Ltd.) | 5 mass parts |

The foaming process is performed so that the expansion ratio becomes double by mixing and stirring the resin coating solution, in which the above-described components are mixed, with air at stirring rate of 500 rpm by the continuous foaming machine (trade name: Turbo Whip TW-70, manufactured by Aicohsha Manufacturing Co., Ltd.).

When the viscosity of a sample in which the prepared resin coating solution is applied and dried is measured by the flow tester while the temperature is changed, the temperature at which the viscosity becomes $1\times10^4$ Pa·s is 70° C., and the gradient R of the viscosity-temperature curve is 0.018.

Example 7

The electrophotographic transfer paper whose basis weight is 161 g/m$^2$ is obtained in the same way as Example 4 except where the amount of coating is changed to 4 g/m$^2$. Table 1 shows characteristics of the substrate and the thermoplastic foamed resin layer.

(Preparation of Resin Coating Solution)

| | |
|---|---|
| Thermoplastic resin D: Mixed resin in which a styrene acrylic resin (trade name: ZAIKTHENE AC, manufactured by SUMITOMO SEIKA CHEMICALS CO., LTD.) and a polyester resin (trade name: Phoenix PE-723, manufactured by FUTABA FINE CHEMICALS CO., LTD.) are mixed with the mass ratio of 1:1 | 100 mass parts |
| Foam stabilizer (higher fatty acids, trade name: DC100A, manufactured by SAN NOPCO LIMITED) | 10 mass parts |
| Thickener (carboxymethyl cellulose, trade name: AG gum SG, manufactured by DAI-ICHI KOGYO SEIYAKU CO., LTD.) | 5 mass parts |
| Release agent (polyether modified silicone oil, trade name: PraffinWax HNP-9, manufactured by NIPPON SEIRO Co., Ltd.) | 5 mass parts |

The foaming process is performed so that the expansion ratio becomes three times by mixing and stirring the resin coating solution, in which the above-described components are mixed, with air at stirring rate of 1000 rpm by the continuous foaming machine (trade name: Turbo Whip TW-70, manufactured by Aicohsha Manufacturing Co., Ltd.).

When the viscosity of a sample in which the prepared resin coating solution is applied and dried is measured by the flow tester while the temperature is changed, the temperature at which the viscosity becomes $1\times10^4$ Pa·s is 76° C., and the gradient R of the viscosity-temperature curve is 0.026.

Example 8

The electrophotographic transfer paper whose basis weight is 193 g/m$^2$ is obtained in the same way as Example 4 except where the amount of coating is changed to 36 g/m$^2$. Table 1 shows characteristics of the substrate and the thermoplastic foamed resin layer.

(Preparation of Resin Coating Solution)

| | |
|---|---|
| Thermoplastic resin E: Mixed resin in which a polyester resin (trade name: Polyester WR-961, manufactured by The Nippon Synthetic Chemical Co., Ltd.) and a styrene acrylic resin (trade name: ZAIKTHENE AC, manufactured by SUMITOMO SEIKA CHEMICALS CO., LTD.) are mixed with the mass ratio of 4:1 | 100 mass parts |
| Foam stabilizer (higher fatty acids, trade name: DC100A, manufactured by SAN NOPCO LIMITED) | 10 mass parts |
| Thickener (carboxymethyl cellulose, trade name: AG gum SG, manufactured by DAI-ICHI KOGYO SEIYAKU CO., LTD.) | 5 mass parts |
| Release agent (polyether modified silicone oil, trade name: KF-354L, manufactured by Shin-Etsu Chemical Co., Ltd.) | 5 mass parts |

The foaming process is performed so that the expansion ratio becomes three times by mixing and stirring the resin coating solution, in which the above-described components are mixed, with air at stirring rate of 1000 rpm by the continuous foaming machine (trade name: Turbo Whip TW-70, manufactured by Aicohsha Manufacturing Co., Ltd.).

When the viscosity of a sample in which the prepared resin coating solution is applied and dried is measured by the flow tester while the temperature is changed, the temperature at which the viscosity becomes $1\times10^4$ Pa·s is 77° C., and the gradient R of the viscosity-temperature curve is 0.10.

Comparative Example 1

The substrate is coated with the resin coating solution prepared in Example 1 without foaming the resin coating solution, and the electrophotographic transfer paper whose basis weight is 167 g/m$^2$ is obtained. Table 2 shows characteristics of the substrate and the thermoplastic foamed resin layer.

Comparative Example 2

The substrate used in Example 3 is coated with the resin coating solution used in Example 6, the stirring rate and the expansion ratio are changed, and the electrophotographic transfer paper whose basis weight is 167 g/m$^2$ is obtained. Table 2 shows characteristics of the substrate and the thermoplastic foamed resin layer.

Comparative Example 3

The electrophotographic transfer paper whose basis weight is 167 g/m$^2$ is obtained on one of surfaces of the substrate used in Example 4 by using the bubble-contained resin coating solution having the following composition in the same way as Example 1. Table 2 shows characteristics of the substrate and the thermoplastic foamed resin layer.

(Preparation of Resin Coating Solution)

| | |
|---|---|
| Thermoplastic resin F (trade name: Super Ester E-720, manufactured by Arakawa Chemical Industries, Ltd.) | 100 mass parts |
| Foam stabilizer (higher fatty acids, trade name: DC100A, manufactured by SAN NOPCO LIMITED) | 10 mass part |
| Thickener (carboxymethyl cellulose, trade name: AG gum SG, manufactured by DAI-ICHI KOGYO SEIYAKU CO., LTD.) | 5 mass parts |
| Release agent (polyether modified silicone oil, trade name: KF-354L, manufactured by Shin-Etsu Chemical Co., Ltd.) | 5 mass parts |

The foaming process is performed so that the expansion ratio becomes three times by mixing and stirring the resin coating solution, in which the above-described components are mixed, with air at stirring rate of 1000 rpm by the continuous foaming machine (trade name: Turbo Whip TW-70, manufactured by Aicohsha Manufacturing Co., Ltd.).

When the viscosity of a sample in which the prepared resin coating solution is applied and dried is measured by the flow tester while the temperature is changed, the temperature at which the viscosity becomes $1\times10^4$ Pa·s is 99° C., and the gradient R of the viscosity-temperature curve is 0.16.

Comparative Example 4

The electrophotographic transfer paper whose basis weight is 158 g/m$^2$ is obtained by using the bubble-contained resin coating solution having the following composition in the same way as Example 1 except where the amount of coating is changed to 1 g/m$^2$. Table 2 shows characteristics of the substrate and the thermoplastic foamed resin layer.

(Preparation of Resin Coating Solution)

| | |
|---|---|
| Thermoplastic resin G: a polyester resin (trade name: Fine Tex ES-850, manufactured by DAINIPPON INK AND CHEMICALS, INCORPORATED) | 100 mass parts |
| Foam stabilizer (higher fatty acids, trade name: DC100A, manufactured by SAN NOPCO LIMITED) | 10 mass parts |
| Thickener (carboxymethyl cellulose, trade name: AG gum SG, manufactured by DAI-ICHI KOGYO SEIYAKU CO., LTD.) | 5 mass parts |
| Release agent (polyether modified silicone oil, trade name: KF-354L, manufactured by Shin-Etsu Chemical Co., Ltd.) | 5 mass parts |

The foaming process is performed so that the expansion ratio becomes three times by mixing and stirring the resin coating solution, in which the above-described components are mixed, with air at stirring rate of 500 rpm by the continuous foaming machine (trade name: Turbo Whip TW-70, manufactured by Aicohsha Manufacturing Co., Ltd.).

When the viscosity of a sample in which the prepared resin coating solution is applied and dried is measured by the flow tester while the temperature is changed, the temperature at which the viscosity becomes $1\times10^4$ Pa·s is 56° C., and the gradient R of the viscosity-temperature curve is 0.063.

Comparative Example 5

The electrophotographic transfer paper whose basis weight is 202 g/m$^2$ is obtained by using the bubble-contained resin coating solution having the following composition in the same way as Example 1 except where the amount of coating is changed to 45 g/m$^2$. Table 2 shows characteristics of the substrate and the thermoplastic foamed resin layer.

(Preparation of Resin Coating Solution)

| | |
|---|---|
| Thermoplastic resin H: a polyester resin (trade name: Polyester WR-905, manufactured by The Nippon Synthetic Chemical Co., Ltd.) | 100 mass parts |
| Foam stabilizer (higher fatty acids, trade name: DC100A, manufactured by SAN NOPCO LIMITED) | 10 mass parts |
| Thickener (carboxymethyl cellulose, trade name: AG gum SG, manufactured by DAI-ICHI KOGYO SEIYAKU CO., LTD.) | 5 mass parts |
| Release agent (polyether modified silicone oil, trade name: KF-354L, manufactured by Shin-Etsu Chemical Co., Ltd.) | 5 mass parts |

The foaming process is performed so that the expansion ratio becomes three times by mixing and stirring the resin coating solution, in which the above-described components are mixed, with air at stirring rate of 500 rpm by the continuous foaming machine (trade name: Turbo Whip TW-70, manufactured by Aicohsha Manufacturing Co., Ltd.).

When the viscosity of a sample in which the prepared resin coating solution is applied and dried is measured by the flow tester while the temperature is changed, the temperature at which the viscosity becomes $1\times10^4$ Pa·s is 135° C., and the gradient R of the viscosity-temperature curve is 0.055.

Comparative Example 6

The electrophotographic transfer paper whose basis weight is 167 g/m$^2$ is obtained in the same way as Example 1 except where the bubble-contained resin coating solution having the following composition is used. Table 2 shows characteristics of the substrate and the thermoplastic foamed resin layer.

(Preparation of Resin Coating Solution)

| | |
|---|---|
| Thermoplastic resin (styrene acrylic resin, trade name: JOHNCRYL 52, manufactured by Johnson polymer) | 100 mass parts |
| Foam stabilizer (higher fatty acids, trade name: DC100A, manufactured by SAN NOPCO LIMITED) | 10 mass parts |
| Thickener (carboxymethyl cellulose, trade name: AG gum SG, manufactured by DAI-ICHI KOGYO SEIYAKU CO., LTD.) | 5 mass parts |
| Release agent (polyether modified silicone oil, trade name: KF-354L, manufactured by Shin-Etsu Chemical Co., Ltd.) | 5 mass parts |

The foaming process is performed so that the expansion ratio becomes three times by mixing and stirring the resin coating solution, in which the above-described components are mixed, with air at stirring rate of 1000 rpm by the continuous foaming machine (trade name: Turbo Whip TW-70, manufactured by Aicohsha Manufacturing Co., Ltd.).

When the viscosity of a sample in which the prepared resin coating solution is applied and dried is measured by the flow tester while the temperature is changed, the temperature at which the viscosity becomes $1\times10^4$ Pa·s is 95° C., and the gradient R of the viscosity-temperature curve is 0.012.

(Quality Evaluation Method)

Table 1 and Table 2 show evaluation results of each obtained electrophotographic transfer paper. The details of an image forming test and measuring methods concerning evaluation items shown in Tables 1 and 2 are as follows:

(Formation of Image)

The obtained electrophotographic transfer paper is evaluated with an image forming apparatus having the same configuration as FIG. 1 (trade name: DocuCentreColor 500 with oil-free fixing mechanism similar to FIG. 2, manufactured by Fuji Xerox Co., Ltd.) while the image is outputted in thick paper mode 2 as fixing condition.

(Basis Weight Measuring Method)

The basis weight is measured based on the method defined in JIS (Japanese Industrial Standard) P 8124.

(Viscosity Measuring Method)

The flow tester (trade name: CFT-500, manufactured by Shimadzu Corporation) is used for the measurement of the viscosity and the production of the viscosity-temperature curve. The previously dried resin coating solution used for the formation of the thermoplastic foamed resin layer (or thermoplastic resin layer) of 1.2 g is formed in a cylindrical shape with a sampler to be used as a measurement sample.

In measurement conditions, test pressure is set to 10 kgf, a rate of temperature increase is set to 3° C./min, a pre-heat time is set to 300 sec, a hole diameter in a central portion of a sample stage is set to 0.5 mm, and a thickness (length) of the hole is set to 1 mm.

(Measuring Method Concerning Pore)

A scanning electron microscope or an optical microscope is used for the average pore diameter on the surface of the thermoplastic foamed resin layer, the ratio of the number of pores having diameters not lower than 80 μm to the whole number of pores, and the surface pore area rate. After the surface of the thermoplastic foamed resin layer is photographed, an outline of the pore on the surface is accurately drawn on transparent film with a black pen, and the measurement is performed with a drum scanner (trade name: LUZEX III, manufactured by NIRECO Corporation).

Because the shape of the pore formed on the surface of the thermoplastic foamed resin layer is not always a circle having perfect roundness, the value which is converted into the diameter corresponding to the circle on the basis of the area inside the outline obtained with the image analysis apparatus is utilized as the pore diameter. The average pore diameter, the ratio of the number of pores having diameters not lower than 80 μm to the whole number of pores, and the surface pore area rate are calculated according to the value of the pore diameter. The surface pore area rate is computed based on by Equation (2).

(Gloss Measuring Method)

Gloss is measured with a gloss measuring apparatus (trade name: GM-26D, manufactured by MURAKAMI COLOR RESEARCH LABORATORY) based on the method defined by JIS Z 874 ion condition that an incidence angle and a light-reception angle are 60° for the image portion after the fixing.

(Δ-Gloss: Evaluation of Evenness of Image Portion Gloss)

A color chart (S7) image sample is produced based on high-definition color digital standard image data (ISO/JIS-SCID pursuant to JIS X 9201-1995, published by Japanese Standards Association), and Δ-gloss of the image portion is confirmed. Δ-gloss shall mean a value defined by the following Equation (3).

$$\Delta\text{-gloss }(\%)=\text{maximum gloss portion }(\%)-\text{minimum gloss portion }(\%) \tag{3}$$

The evaluation results shown in Tables 1 and 2 are based on the following criteria for evaluation.

(Δ-Gloss Criteria for Evaluation)

Excellent: Δ-gloss value is lower than 5%

Good: Δ-gloss value is not lower than 5% and is lower than 10%

Average: Δ-gloss value is not lower than 10% and is lower than 20%

Poor: Δ-gloss value is not lower than 20%

(Evaluation of Image Step)

A difference in longitudinal level of the boundary portion between the non-image portion and the image portion is evaluated as an image step. The step between a third-color 100% fixing portion and a non-image portion is measured with an ultra-depth shape microscope (trade name: VK-8000, manufactured by KEYENCE CORPORATION). The values shown in Tables 1 and 2 are the average value of the measurement values of five points.

TABLE 1

| | | Example 1 | Example 2 | Example 3 | Example 4 | Example 5 | Example 6 | Example 7 | Example 8 |
|---|---|---|---|---|---|---|---|---|---|
| | Basis Weight (g/m$^2$) | 167 | 167 | 167 | 167 | 167 | 167 | 161 | 193 |
| Substrate | Air Permeability (sec) | 24 | 900 | 1500 | 16000 | 24 | 24 | 16000 | 16000 |
| Thermoplastic Foamed Resin Layer | Temperature at which Viscosity becomes 1 × 10$^4$ Pa · s (° C.) | 93 | 93 | 93 | 93 | 62 | 70 | 76 | 77 |
| | Gradient R | 0.038 | 0.038 | 0.038 | 0.038 | 0.092 | 0.018 | 0.026 | 0.10 |
| | Average Pore Diameter (μm) | 9.6 | 9.7 | 9.2 | 9.6 | 2.0 | 72.5 | 10.2 | 9.7 |
| | Ratio of (Pores having Diameter not lower than 80 μm/All Pores) (%) | 1.1 | 1.1 | 1.2 | 1.4 | 0.1 | 16.2 | 1.1 | 1.5 |
| | Surface Pore Area Rate (%) | 34.8 | 32.7 | 34.1 | 35.8 | 15.6 | 71.4 | 29.8 | 36.9 |
| | Amount of Coating (g/m$^2$) | 10 | 10 | 10 | 10 | 10 | 10 | 4 | 36 |
| Evaluation Results | Maximum Gloss (60° Gloss %) | 79 | 86 | 76 | 74 | 68 | 72 | 65 | 75 |
| | ΔGloss (%) | Excellent | Excellent | Excellent | Excellent | Good | Good | Good | Excellent |
| | Image Step between Third-Color 100% Fixing Portion and Non-Image Portion (μm) | 0.1 | 0.1 | 0.3 | 0.1 | 0.2 | 0.1 | 0.5 | 0.3 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| | Basis Weight (g/m$^2$) | 167 | 167 | 167 | 158 | 202 | 167 |
| Substrate | Air Permeability (sec) | 24 | 1500 | 16000 | 24 | 24 | 24 |
| Thermoplastic Foamed Resin Layer or Thermoplastic Resin Layer | Temperature at which Viscosity becomes 1 × 10$^4$ Pa · s (° C.) | 93 | 70 | 99 | 56 | 135 | 95 |
| | Gradient R | 0.038 | 0.018 | 0.16 | 0.063 | 0.055 | 0.012 |
| | Average Pore Diameter (μm) | 0 | 0.5 | 9.1 | 10.1 | 10.4 | 10.2 |
| | Ratio of (Pores having Diameter not lower than 80 μm/All Pores) (%) | 0 | 0.2 | 1.0 | 1.1 | 1.4 | 1.1 |
| | Surface Pore Area Rate (%) | 0 | 8.4 | 32.8 | 34.2 | 35.8 | 38.1 |
| | Amount of Coating (g/m$^2$) | 10 | 10 | 10 | 1 | 45 | 10 |

TABLE 2-continued

| | | Comparative Example 1 | Comparative Example 2 | Comparative Example 3 | Comparative Example 4 | Comparative Example 5 | Comparative Example 6 |
|---|---|---|---|---|---|---|---|
| Evaluation Results | Maximum Gloss (60° Gloss %) | 76 | 78 | 69 | Resin | 19 | 55 |
| | ΔGloss (%) | Poor | Poor | Poor | Adhesion to | Poor | Average |
| | Image Step between Third-Color 100% Fixing Portion and Non-Image Portion (μm) | 10 | 5 | 5 | Fixing Roll | 8 | 2 |

As can be seen from the results of Tables 1 and 2, the use of the electrophotographic transfer paper of the invention can obtain the image in which the toner is embedded well, the gloss difference of the whole image forming surface is eliminated, and there is a sense of glossiness. The electrophotographic transfer paper of the invention is extremely useful from a workable standpoint.

What is claimed is:

1. An electrophotographic transfer paper having a substrate and a thermoplastic foamed resin layer which is provided on at least one surface of the substrate and has pores, wherein the temperature at which the viscosity of the thermoplastic foamed resin layer becomes $1\times10^4$ Pa·s ranges from 60° C. to 100° C. and a gradient R of a viscosity-temperature curve of the thermoplastic foamed resin layer defined by the following Equation (1) ranges from 0.02 to 0.10:

$$R=\{Log(\eta_t)-\text{Log}(\eta_{t+20})\}/20 \quad (1)$$

where $\eta_t$ indicates $1\times10^4$ Pa·s and $\eta_{t+20}$ indicates the viscosity (Pa·s) of the thermoplastic foamed resin layer at a temperature higher by 20° C. than the temperature showing the viscosity $\eta_t$.

2. An electrophotographic transfer paper having a substrate whose air permeability is lower than 1000 seconds and a thermoplastic foamed resin layer which is provided on at least one surface of the substrate and has pores, wherein the temperature at which the viscosity of the thermoplastic foamed resin layer becomes $1\times10^4$ Pa·s ranges from 60° C. to 100° C. and a gradient R of a viscosity-temperature curve of the thermoplastic foamed resin layer defined by the following Equation (1) ranges from 0.015 to 0.10:

$$R=\{Log(\eta_t)-\text{Log}(\eta_{t+20})\}/20 \quad (1)$$

where $\eta_t$ indicates $1\times10^4$ (Pa·s) and $\eta_{t+20}$ indicates the viscosity (Pa·s of the thermoplastic foamed resin layer at a temperature higher by 20° C. than the temperature showing the viscosity $\eta_t$.

3. An electrophotographic transfer paper according to claim 2, wherein the gradient R ranges from 0.018 to 0.09.

4. An electrophotographic transfer paper having a substrate whose air permeability is not lower than 1000 seconds and a thermoplastic foamed resin layer which is provided on at least one surface of the substrate and has pores, wherein the temperature at which the viscosity of the thermoplastic foamed resin layer becomes $1\times10^4$ Pa·s ranges from 60° C. to 100° C. and a gradient R of a viscosity-temperature curve of the thermoplastic foamed resin layer defined by the following Equation (1) ranges from 0.02 to 0.15:

$$R=\{\text{Log}(\eta_t)-\text{Log}(\eta_{t+20})\}/20 \quad (1)$$

where $\eta_t$ indicates $1\times10^{\ 4}$ Pa·s and $\eta_{t+20}$ indicates the viscosity (Pa·s) of the thermoplastic foamed resin layer at a temperature higher by 20° C. than the temperature showing the viscosity $\eta_t$.

5. An electrophotographic transfer paper according to claim 4, wherein the gradient R ranges from 0.04 to 0.12.

6. An electrophotographic transfer paper according to claim 1, wherein an average diameter of pores on a surface of the thermoplastic foamed resin layer ranges from 1.5 μm to 80 μm.

7. An electrophotographic transfer paper according to claim 1, wherein the average diameter of the pores on the surface of the thermoplastic foamed resin layer ranges from 2 μm to 60 μm.

8. An electrophotographic transfer paper according to claim 1, wherein a ratio of the number of pores having diameters not lower than 80 μm to the number of all pores t on the surface of a thermoplastic foamed resin layer (pores having diameters not lower than 80 μm/all pores) is not more than 20%.

9. An electrophotographic transfer paper according to claim 1, wherein the ratio of the number of the pores having diameters not lower than 80 μm to the number of all the pores on the surface of the thermoplastic foamed resin layer (pores having diameters not lower than 80 μm/all pores) is not more than 5%.

10. An electrophotographic transfer paper according to claims 1, wherein the ratio of the area of pores on a surface of the thermoplastic foamed resin layer to the area of the entire surface ranges from 10% to 80%.

11. An electrophotographic transfer paper according to claim 1, wherein the ratio of the area of the pores on the surface of the thermoplastic foamed resin layer to the area of the entire surface ranges from 20% to 70%.

12. An electrophotographic transfer paper according to claim 1, wherein an amount of coating per single side of the substrate of the thermoplastic foamed resin layer ranges from 2 $g/m^2$ to 40 $g/m^2$ in terms of dry mass.

13. An electrophotographic transfer paper according to claim 1, wherein the amount of coating per single side of the substrate of the thermoplastic foamed resin layer ranges from 5 $g/m^2$ to 30 $g/m^2$ in terms of dry mass.

14. An electrophotographic transfer paper according to claim 1, wherein the thermoplastic foamed resin layer contains a release agent.

15. An electrophotographic transfer paper according to claim 14, wherein the release agent is selected from waxes, higher fatty acids, higher alcohols, higher fatty amides, and silicone oils.

16. An electrophotographic transfer paper according to claim 14, wherein the thermoplastic foamed resin layer contains the release agent in an amount ranging from 0.1 mass % to 20 mass %.

17. An electrophotographic transfer paper according to claim 1, wherein a resin used for the thermoplastic foamed resin layer is a polyester resin.

18. An electrophotographic transfer paper according to claim 1, wherein a resin used for the thermoplastic foamed resin layer is a styrene-acrylic resin.

19. An electrophotographic transfer paper according to claim 1, wherein a resin used for the thermoplastic foamed resin layer is a material in which at least two thermoplastic resins are blended.

20. The electrophotographic transfer paper according to claim 2, wherein the air permeability of the substrate is not lower than 10 sec.

21. The electrophotographic transfer paper according to claim 4, wherein the air permeability of the substrate is not more than 20,000 sec.

* * * * *